No. 607,971. Patented July 26, 1898.
F. UPSHAW.
STALK CHOPPER.
(Application filed Feb. 17, 1898.)
(No Model.)
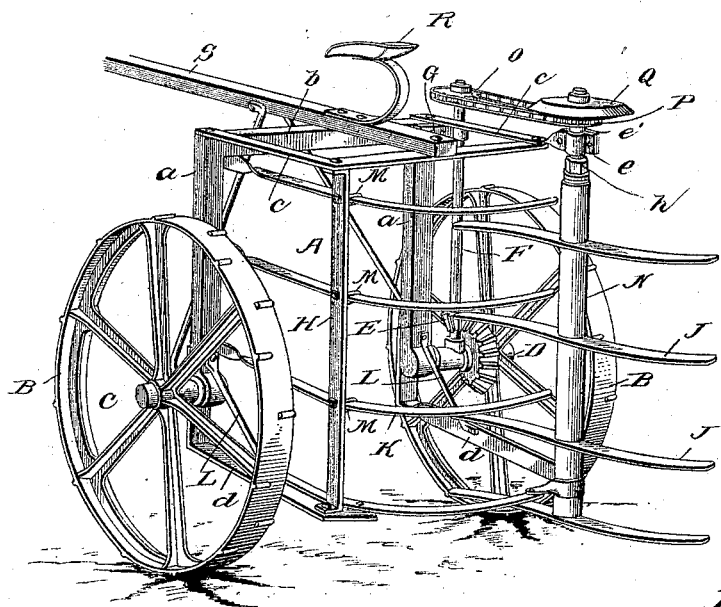
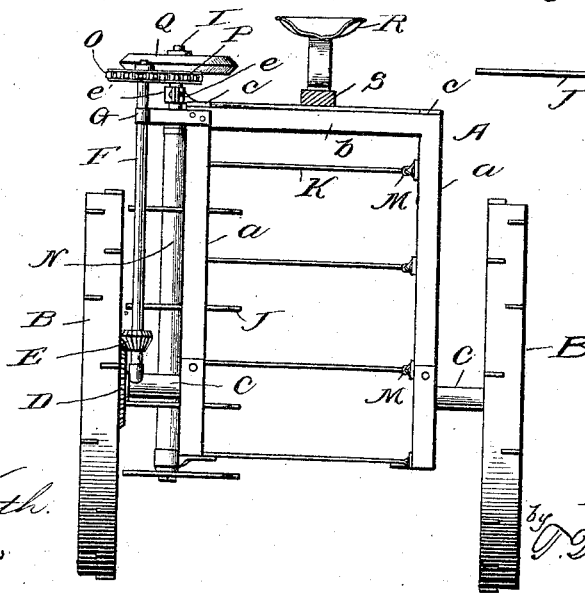
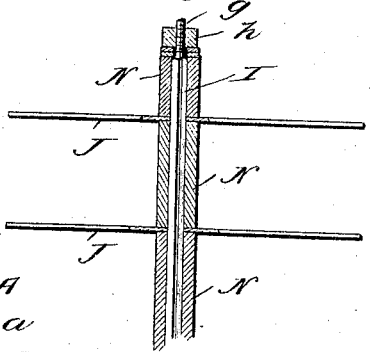
Witnesses
Inventor
Foy Upshaw
by T. Walter Fowler
his Attorney
THE NORRIS PETERS CO., PHOTO-LITHO., WASHINGTON, D. C.

UNITED STATES PATENT OFFICE.

FOY UPSHAW, OF VAN ALSTYNE, TEXAS, ASSIGNOR OF ONE-HALF TO
MARTIN L. BUSH, OF SAME PLACE.

STALK-CHOPPER.

SPECIFICATION forming part of Letters Patent No. 607,971, dated July 26, 1898.

Application filed February 17, 1898. Serial No. 670,695. (No model.)

*To all whom it may concern:*

Be it known that I, FOY UPSHAW, a citizen of the United States, residing at Van Alstyne, in the county of Grayson and State of Texas, have invented new and useful Improvements in Stalk-Choppers, of which the following is a specification.

My invention relates to that class of agricultural machines known as "stalk-choppers," and particularly to the type of such machines which employ a vertical shaft carrying a series of revolving bars or cutters and operating in conjunction with a corresponding series of fixed bars, whereby, the machine being driven through the field, the standing stalks are broken into short lengths.

My invention consists in the parts and the constructions and combinations of parts, which I shall hereinafter fully describe, and point out in the claims.

Referring to the accompanying drawings, wherein like letters of reference indicate corresponding parts, Figure 1 is a perspective view of a stalk-chopper constructed according to my invention. Fig. 2 is a front elevation of the same. Figs. 3 and 4 are details to be referred to.

In said drawings the frame A of the machine may be of any appropriate character, and is herein shown as consisting of vertical plates or bars $a$, connected at their upper ends by a cross plate or bar $b$, so as to form an arched open front to the machine to permit the stalks to readily pass to the cutting appliances hereinafter mentioned.

The supporting and driving wheels B are of the type commonly used for traction purposes, and they rotate upon short axles or spindles C, projecting from the vertical bars $a$, one of said wheels having secured to it a beveled gear-wheel D, adapted to mesh with and drive a beveled pinion E on the lower end of a vertical shaft F at one side of the front of the machine, said shaft having its lower end suitably stepped and its upper end journaled in a box or bearing G, bolted to the frame, as shown in Fig. 1.

The sides of the main frame are open, and consist of the horizontal plates or bars $c\ d$, extending rearwardly from the arched front and having their rear portions connected on one side by a vertical bar H, to which the stationary bars K of the cutting devices are secured, and on the opposite side by means of the vertical shaft I, which carries the revolving arms or cutters J, one of said bars $c$ being given a partial twist in its length, so that its rear portion may stand on edge and form one member of a bearing $e$, whose companion member is a cap-plate $e'$, these parts serving as a journal-bearing for the upper portion of the vertical shaft, which carries the blades or cutters. The lower member $d$ of the side bars of one side of the frame is also partially twisted in its length, and thence extends on edge around the lower portion of the shaft, or a sleeve thereon, and has its extremity again twisted and bolted to the lowermost of the stationary bars K, projecting from the vertical bar H, whereby said arm serves as a secure brace and connection for the lower rear portions of the sides of the machine, an additional curved or inclined brace L being employed, if desired, to connect the lower side bar on the side which carries the vertical shaft with the front portion of the machine to securely and rigidly connect the parts and to resist the strain due to the cutting action on the lower side bar.

The stationary bars K of the cutting devices are secured at the forward ends to the arched front of the machine, from which point they extend rearwardly and are thence given a partial twist, so that their remaining portions lie horizontal and are secured to the vertical bar H by means of hook-bolts M and nuts, as shown, the rear portions of said bars standing at such an angle to the vertical bar which carries them that they closely hug the row of standing stalks during the cutting operation, the lowermost of these stationary cutting-bars forming the brace and connection between the lower rear portions of the sides of the machine, as before alluded to.

The vertical shaft which carries the revolving cutter-bars is preferably made square in cross-section, Fig. 4, and the cutter-bars are made in pairs, reversely curved, with their central portions formed with square openings, whereby they may be fitted to the shaft to revolve therewith, said bars being separated from each other by means of short sleeves N on the shaft, as shown in Fig. 3, which sleeves may be separate from the cutter-bars or may represent the extended hubs thereof. The upper portion of the shaft I is threaded at $g$ and receives a nut $h$, whereby the cutter-bars and their sleeves are properly held in position and any wear between their surfaces taken up.

The vertical shaft is driven by power derived from one of the main wheels through the medium of a sprocket-wheel O on the upper end of the vertical shaft F at the front side of the machine and a chain passing from said sprocket-wheel to and around a sprocket-pinion P on the upper portion of the vertical shaft I, which carries the cutter-bars, said shaft I being extended above said pinion and provided with a balance-wheel Q, whereby the increased momentum imparted by this wheel during the cutting operation results in the cutter-bars readily forcing their way through even the largest and strongest of the stalks. This balance-wheel has also been found to resist the tendency of the main driving-wheel slipping when the machine is working in a field of heavy stalks.

The machine is supplied with the usual driver's seat R, tongue or pole S, and suitable draft appliances for the team, and when constructed as shown and described has been found very effective even under the most trying conditions of soil and stubble.

Having thus described my invention, what I claim as new, and desire to secure by Letters Patent, is—

1. In a stalk-chopper, the combination, of a frame having its front end arched and extended above its bearing-wheels, axles extending from the sides of said front and provided with bearing-wheels, one of said wheels having a gear-wheel fixed to it, a vertical shaft at one side of said front and provided with a pinion engaged and driven by said gear-wheel, a rotatable shaft at the rear of the machine and provided with cutter-bars, means for rotating said shaft from the first-named shaft and stationary cutter-bars at the opposite side of the machine, secured at the forward ends to the arched front and having their rear portions standing at an angle, and a vertical bar to which the intermediate portions of the stationary cutter-bars are secured.

2. In a stalk-chopper, the combination, of a frame consisting of a front portion arched and extended above the main wheels and upper and lower bars extended rearwardly to form the sides, a vertical bar connecting the upper and lower bars of one side and a vertical driven shaft connecting the upper and lower bars of the opposite side, stationary cutter-bars secured at their forward ends to the arched front and thence extended rearwardly and inclined inwardly, and secured to said vertical bar, the lowermost of the stationary cutter-bars connected with the lower frame-bar of the opposite side of the machine, to form an inclined brace, cutter-bars on the rotatable shaft and opposing the stationary bars and means for rotating said vertical shaft by power derived from one of the main bearing-wheels.

3. In a stalk-chopper, the main frame with its arched front and bearing-wheels and the vertical bar at the rear of one side of said frame, a rotatable shaft at the opposite side of the machine and provided with cutter-bars, means for rotating said shaft by power derived from one of the main bearing-wheels, and the stationary cutter-bars secured at their forward ends to the arched front and thence extended rearwardly and twisted so that their rear portions lie approximately horizontal, and hook-bolts embracing said bars between opposite ends with their shanks passing through holes in the vertical bar, and nuts engaging said shanks.

4. In a stalk-chopper, the frame with its bearing-wheels and stationary cutter-bars, in combination with a rotatable shaft having a square or approximately square cross-section, and threaded upper portion, cutter-bars having square or approximately square holes to receive said shaft, sleeves on said shaft and spacing the cutter-bars thereof, a nut engaging the threaded portion of the shaft and clamping the bars and sleeves, a balance-wheel on the upper end of the shaft and means for driving said shaft by power derived from one of the main bearing-wheels.

5. An improved stalk-chopper consisting of a frame having an arched front and rearwardly-extending sides, a vertical shaft at the rear of one side of the frame and a vertical bar at the rear of the opposite side of said frame, stationary cutter-bars secured at their forward ends to the front of the machine and thence extended rearwardly with their rear ends inclined inwardly, hook-bolts connecting these bars with the vertical bar, the lowermost of the cutter-bars connecting one rear side of the frame with the other, reversely-curved cutter-bars carried by the vertical shaft and separated from each other by sleeves, a nut on the shaft for tightening the sleeves and bars, and a balance-wheel on said shaft, a second vertical shaft journaled at the front of the machine, having a pinion on its lower end engaging a gear-wheel, on one of the main bearing-wheels, a sprocket-wheel on the upper portion of said second shaft and a chain connecting the same with a pinion on the first-named shaft whereby the latter is rotated.

In testimony whereof I have hereunto set my hand in presence of two subscribing witnesses.

FOY UPSHAW.

Witnesses:
F. H. MASSIE,
J. W. O'DANIEL.